United States Patent [19]

Aidlin et al.

[11] Patent Number: 4,938,636

[45] Date of Patent: Jul. 3, 1990

[54] METHOD AND APPARATUS FOR FEEDING CONTAINER BODIES

[75] Inventors: Samuel S. Aidlin; Stephen H. Aidlin; Larry Kincaid, all of Sarasota, Fla.

[73] Assignee: Aidlin Automation Corp., Bradenton, Fla.

[21] Appl. No.: 270,797

[22] Filed: Nov. 14, 1988

[51] Int. Cl.$^5$ ............................................. B65G 51/02
[52] U.S. Cl. .................................... 406/31; 406/181; 406/183; 406/86
[58] Field of Search ........................ 406/19, 22, 26, 31, 406/72, 86, 88, 147, 176, 181, 183

[56] References Cited

U.S. PATENT DOCUMENTS

| | | | |
|---|---|---|---|
| 3,860,031 | 1/1975 | Grilli | 406/183 |
| 3,999,806 | 12/1976 | Hurd | 406/181 |
| 4,275,976 | 6/1981 | Sticht | 406/31 |
| 4,284,370 | 8/1981 | Danler et al. | 406/86 |

Primary Examiner—Sherman D. Basinger
Assistant Examiner—Stephen P. Avila
Attorney, Agent, or Firm—Dominik, Stein, Saccocio, Reese, Colitz & Van Der Wall

[57] ABSTRACT

An improved system for directing a flow of container bodies to a plurality of base cupping machines from a plurality of blow molding machines comprising: (1) a plurality of primary conveyors, each primary conveyor adapted to feed container bodies from a blow molding machine toward a base cupping machine; (2) a plurality of cross-over conveyors for feeding container bodies from one of the primary conveyors to another of the primary conveyor; (3) diverter blades and converger blades positioned at the junction of primary and cross-over conveyors to direct container bodies between various primary conveyors; (4) a sensor upstream and two sensors downstream of each diverter blade and a sensor downstream and two sensors upstream of each converger blade to detect the flow of container bodies therepast; and (5) programmable control means responsive to the sensors to switch the blades as required for proper feeding of container bodies. Also disclosed is a method of feeding a flow of container bodies as with the above-captioned apparatus.

7 Claims, 3 Drawing Sheets

METHOD AND APPARATUS FOR FEEDING CONTAINER BODIES

BACKGROUND OF THE INVENTION

1. Field of the Invention

This invention is a method and apparatus for feeding container bodies in a programmed manner and, more particularly, to the feeding of container bodies from one or more blow molding machines whereat they are fabricated to one or a plurality of base cupping machines for further processing and including, between the machines, primary conveyors, alternate conveyors, diverters, conveyors, detectors and a controller for facilitating the most efficient flow of container bodies.

2. Background of the Invention

In the fabrication and assembly of bottles such as plastic bottles of polyethylene terepthilate (PET) used for soft drinks and the like, the bottle parts, container bodies and base cups, are initially fabricated at molding machine. The parts are then transported along separate paths to a base cupping machine whereat the round bottomed container bodies are coupled with the more rigid base cups for subsequently being filled prior to entering the stream of commerce.

One type of conveyor for such bottles is described in U.S. Pat. No. 4,287,370 issued Aug. 18, 1987 to Danler. According to that disclosure, the container bodies are suspended by their necks from tracks upon which they are supported and along which they move. Louvers are provided in the conveyor adjacent to the sides of the upper portion of the neck for creating a flow of air which will push such bottles along an intended path of travel from the blow molding machine to the base cupping machine. Such conveyor was initially effective for its purpose. It has been found, however, that the speed at which such mechanism could transport container bodies was inadequate for the speed capabilities of advanced blow molding machines and advanced base cupping machines.

A further improvement over the earlier forms of container body conveyors is described in U.S. patent application Ser. No. 07/062,171, filed June 12, 1987, in the name of Aidlin et al. According to that disclosure, the container bodies being conveyed are likewise supported by the neck in depending fashion. In addition to the vertical louvers in the conveyor adjacent to the sides of the upper neck, horizontal louvers are provided above the neck to create a motive force within the bottle itself. The sizes of the plenum chambers forming the conveyors are also varied for greater efficiency and speed. Greatly increased speeds have been realized with such improved conveyors.

With the increased speed of container body movement, it has been found that known styles of sensors and controls were inadequate to properly monitor the flow of bottles. As a result, advanced solid state controllers and sensors were employed for monitoring and controlling the flow of container bodies transported by the improved conveyors. It was found that with the use of advanced solid state controllers and sensors, additional benefits, advantages and capabilities were realized. More specifically, it was found that it was now possible to utilize a plurality of blow molding machines in combination with a plurality of base cupping machines with conveyors arranged in systems configuration with conveyors, diverters, sensors and a programmable solid state controller in such manner as to allow increased utilization of the components of the system. As a result, the efficiency of the components of the overall system is now superior to the sum of the efficiencies of the system components.

Therefore, it is an object of this invention to provide an improved method and apparatus which overcome the aforementioned inadequacies of the prior art devices and provides an improvement which is a significant contribution to the advancement of the conveyor art.

It is a further object of the present invention to provide improved method and apparatus for directing a flow of container bodies to a plurality of base cupping machines from a plurality of blow molding machines comprising: (1) a plurality of primary conveyors, each primary conveyor adapted to feed container bodies from a blow molding machine toward a base cupping machine; (2) a plurality of cross-over conveyor for feeding container bodies from one of the primary conveyors to another of the primary conveyor; (3) diverter and converger blades positioned at the junction of primary and cross-over conveyors to direct container bodies between various primary conveyors; (4) a sensor upstream and two sensors downstream of each diverter blade and a sensor downstream and two sensors upstream of each converger blade to detect the flow of container bodies therepast; and (5) programmable control means responsive to the sensors to switch the blades as required for proper feeding of container bodies.

It is a further object of the invention to monitor and control the flow of container bodies from one or more blow molding machines to one or more bottle cupping machines along preselected paths and to modify the paths to meet the needs and capabilities of the system components.

Lastly, it is an object of the invention to more efficiently, conveniently and economically utilize blow molding machines and base cupping machines in the assembly of bottles.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a system for directing a flow of container bodies to a plurality of base cupping machines from a plurality of blow molding machines. The system comprises a plurality of primary conveyors, each primary conveyor adapted to feed container bodies from a blow molding machine toward a base cupping machine; a plurality of cross-over conveyors for feeding container bodies from one of the primary conveyors to another of the primary conveyor; diverter and converger blades positioned at the junction of primary and cross-over conveyors to direct container bodies between various primary conveyors; a sensor upstream and two sensors downstream of each diverter blade and a sensor downstream and two sensors upstream of each converger blade to detect the flow of container bodies therepast; and programmable control means responsive to the sensors to switch the blades as required for proper feeding of container bodies. The system further includes a shunt path coupled to at least one conveyor through a diverter gate and a converger gate to accept a temporary quantity of containers during a malfunction of a part of the system. A plurality of cross-over conveyors couple each primary conveyor to each other primary conveyor.

The invention may also be incorporated into a conveyor assembly for transporting container bodies from one or more first locations to one or more second locations. The conveyor assembly includes primary pneumatic conveyor means for conveying container bodies from a first location to a second location; a plurality of diverter gates along the primary conveyor means to divert the conveyed container bodies to alternate path; a plurality of converger gates along the primary conveyor means to direct the conveyed container bodies from alternate path; and a plurality of sensors associated with each converger gate downstream thereof and a plurality of sensors associated with each diverter gate upstream thereof for effecting the switching of each gate. Each diverter gate is pivotable about a vertical axis downstream of the juncture of the primary conveyor and alternate path. Each converger gate is pivotable about a vertical axis upstream of the juncture of the primary conveyor and alternate path.

Lastly, the invention may also be incorporated into a method of feeding a flow of container bodies to one or a plurality of base cupping machines from one or a plurality of blow molding machines. The method comprises the steps of providing primary conveyor means for feeding container bodies from a blow molding machine toward a base cupping machine; providing secondary conveyor means for feeding container bodies from the primary conveyor means to a preselected base cupping machine; positioning diverter blades and converger blades at the junction of the primary and secondary conveyor means to direct container bodies along a preselected path to a preselected base cupping machine; sensing the movement of container bodies upstream of each blade and downstream of each blade along the primary conveyor and secondary conveyor; and controlling the blades through programmable control means in response to signals from sensing adjacent to the blades.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other method steps and structures for carrying out the same purposes of the present invention. It should also be realized by those skilled in the art that such equivalent methods and structures do not depart from the spirit and scope of the invention as set forth in the appended claims.

DETAILED DESCRIPTION OF THE DRAWINGS

Similar reference numerals refer to similar parts throughout the various figures.

DETAILED DESCRIPTION OF THE INVENTION

Figure 1:
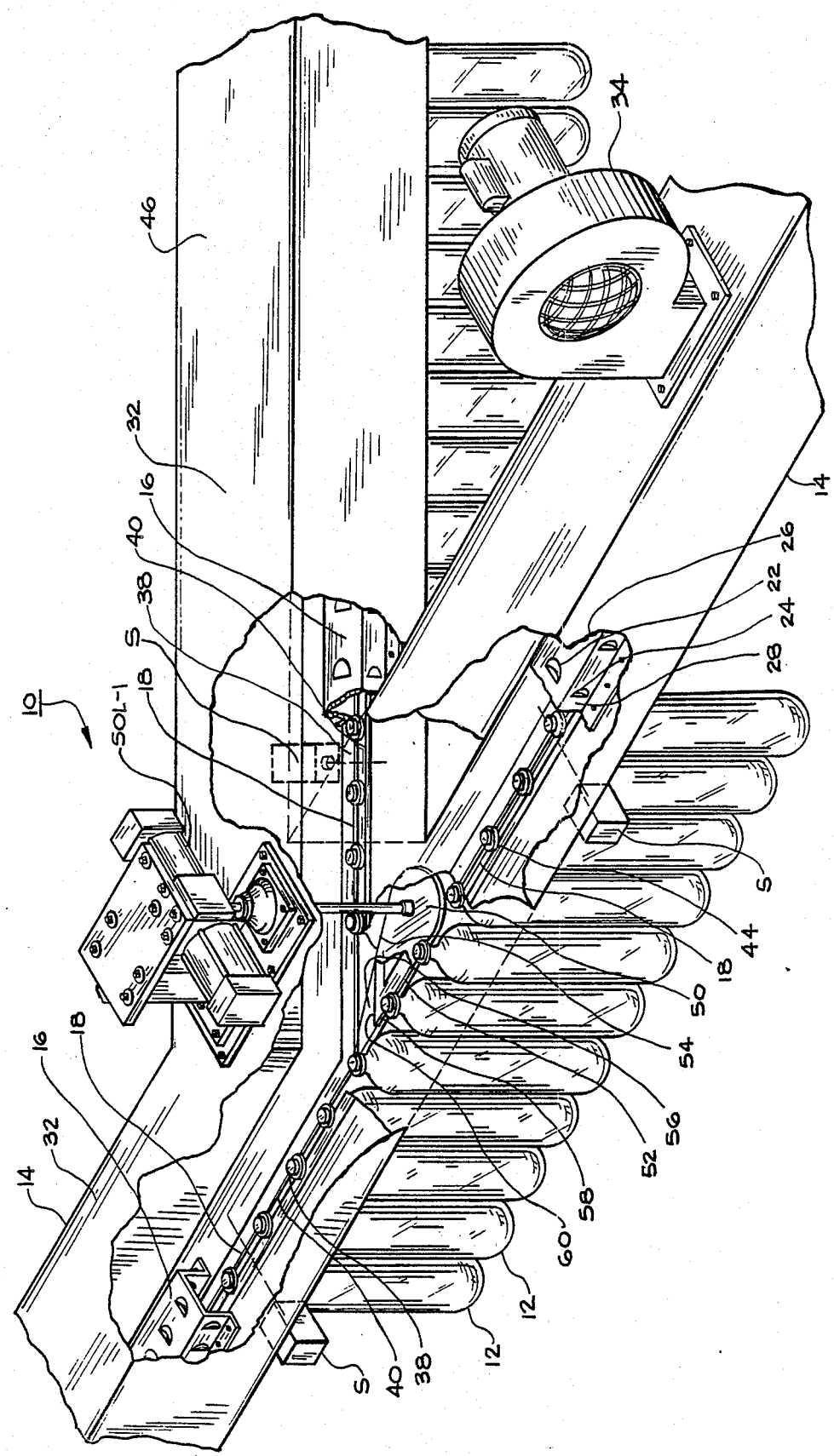
FIG. 1 is a perspective illustration of a portion of an air transport conveyor constructed in accordance with the principals of the present invention.
Figure 2:
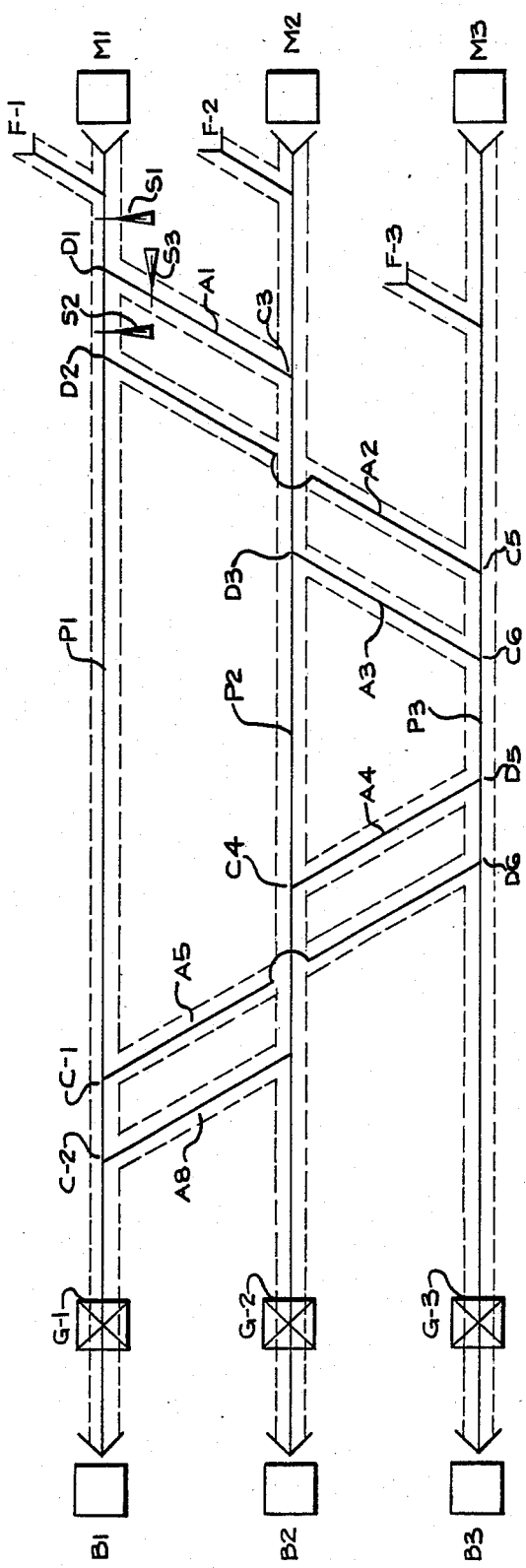
FIG. 2 is a schematic plan view of a preferred embodiment of the present invention.

With particular reference to FIG. 1, there is shown a perspective illustration of a portion of a conveyor system 10 for feeding container bodies 12 from a blow molding machine to a base cupping machine as schematically shown in FIG. 2. Additional conveyors are provided for feeding other parts, such as rigid base cups, to the base cupping machine for attachment to the bottom of the bottle. Further details may be had by reference to U.S. Pat. No. 4,225,375 issued to Aidlin et al and the aforementioned U.S. patent application. Such systems are commercially available from Aidlin Automation Corp. of Bradenton, Fla.

Each conveyor 14 includes a small interior plenum 16 of relative high pressure with a lower opening 18. The plenum 16 also includes louvers 22 and 24 formed in the upper horizontal wall 26 and vertical side walls 28. The side louvers 24 direct air against the sides of the upper portion of the neck of the container body 12 being conveyed. The upper louvers 22 direct air into the opening at the top of the bottle. All the louvers are oriented for effecting a motive force for conveying the container bodies in the intended direction of conveying.

An exterior plenum 32 is located along the length of the interior plenum 16 for constituting a source of pressurized air from blowers 34 through the louvers 22 and 24 for effecting the desired motion of air and container bodies 12. Channels 38 and 40 are located at the lower opening 18 of the interior plenum 16 for supporting the container bodies 12 depending therefrom by an enlargement 44 in the container body neck.

The entire length of the conveyor between the blow molding machine and the base cupping machine is retained in position by supports, not shown. Further details of the conveying assembly and its relationship to a system may be seen with reference to the aforementioned pending U.S. patent application.

Figure 3:
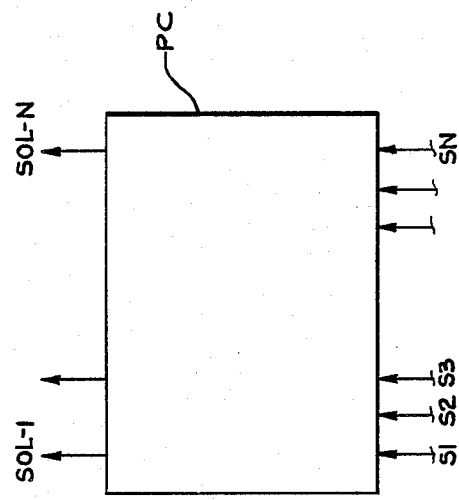
FIG. 3 is an electrical diagram of the control mechanisms for the embodiment of the invention shown in FIGS. 1 and 2.
Figure 4:
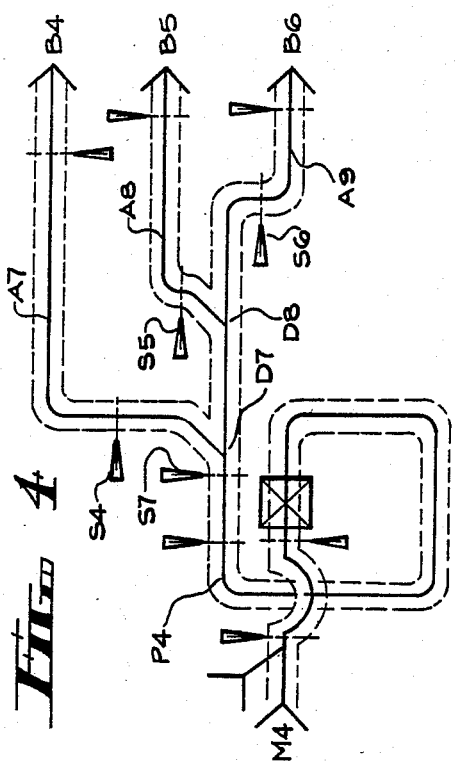
FIGS. 4 through 6 are schematic views of various alternate embodiments of the present inventions.
Figure 5:
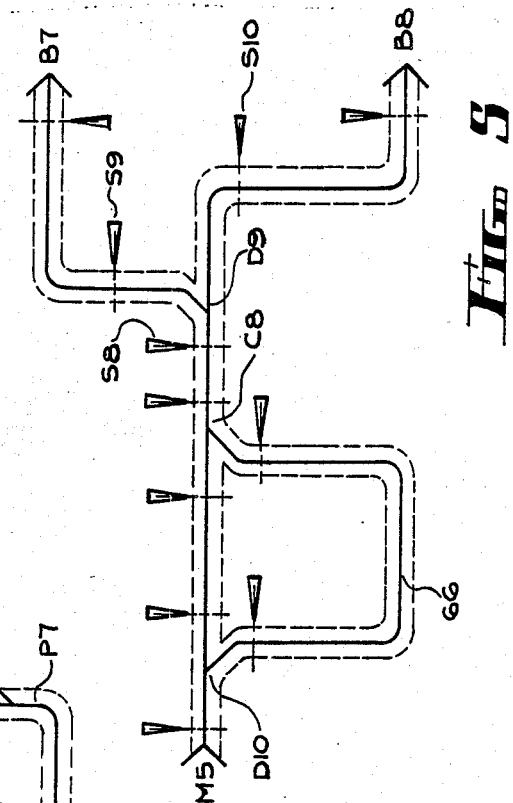

In the embodiment of the invention shown in FIG. 3, a plurality of blow molding machines, M-1, M-2 and M-3, preferably three (3), are adapted to feed container bodies 12 to a plurality of base cupping machines, B-1, B-2 and B-3, preferably three (3), by conveyors 14 along three (3) primary paths P-1, P-2 and P-3. The conveyors 14 may be curved in one direction or the other to accommodate the preferred position of the blow molding machines and base cupping machines as a function of the particular floor space available. Note the embodiments of FIGS. 4, 5 and 6.

Instead of having one blow molding machine feeding one bottle assembly machine, as was the general practice in the prior art, the plurality of conveyors 14 are coupled at locations intermediate their ends at the blow molding and base cupping machines. The coupling of the primary conveyors is effected through cross-over conveyors 46 along alternate paths A-1, A-2 and A-3 adapted to divert container bodies being conveyed along the first path P-1 to the second or third paths P-2 and P-3. Alternate paths A-1, A-2 and A-3 begin at diverter blades D-1, D-2 and D-3 then terminate at converger blades C-1, C-2 and C-3. The conveyors 46 of the alternate paths are preferably of the same construction as those conveyors 14 of the primary paths. In a similar fashion, additional cross-over conveyors 46 along alternate paths A-4, A-5 and A-6 are adapted to convey fed container bodies from the conveyors 14 of the second and third paths P-2 and P-3 to the first primary path. Alternate paths A-4, A-5 and A-6 begin at diverter blades D-4, D-5 and D-6 then terminate at converger blades C-4, C-5 and C-6. As such, cross-over conveyors couple each primary path with each other primary path.

In this manner, any number of individual blow molding machines may separately feed any number of base cupping machines concurrently or sequentially. In alternative modes of operation, one blow molding machine may service all or less than all machines by properly integrating the output of the blow molding machine. No cross-over conveyor, however, need be employed.

At the ends of each cross-over conveyor 46, wedge-shaped diverter blades 50 are positioned to allow bottles to be moved between the primary conveyors and cross-over conveyors. Such wedge-shaped blade, when positioned to direct a flow of container bodies in one direction are positioned to selectively block passage of the container bodies from the other or unintended path. Note FIG. 1. This allows proper movement to the alternate paths. When facing in the direction opposite that of FIG. 1, the diverter blade becomes a converger blade as is needed for full system operation.

More specifically, each blade has two (2) edges 52 and 54 meeting at point 56. When positioned as shown in FIG. 1, edge 52 is aligned with edge 58 of the primary conveyor 14, and edge 54 blocks off the alternate conveyor 46. When switched, edge 54 is aligned with edge 60 of alternate conveyor 46, and edge 52 blocks off the primary conveyor 14. Rotation and switching of each blade 50 is electrically controlled by a programmable controller PC through solenoid Sol-1.

In association with each of the diverter and converger blades, an array of sensors is provided. Each sensor array includes a plurality of optical sensors, S-1 through S-N, one upstream and one downstream of the primary path and one along the alternate path. In this way the entire path for each of the primary and alternate paths may be monitored for maximum efficiency of the system.

The sensors S are shown as commercially available electric photocells to detect and monitor the flow of container bodies to and from each diverting zone. Electric photocells as manufactured by Banner of Minneapolis, Minn., Model Number SBLV have been found suitable for the translucent nature of the fed container bodies.

The first sensor S-1 located upstream from the first diverting blade D-1 and the second sensor S-2 located downstream from the diverting blade D-1 are to verify the continued flow along the primary path P-1. In addition, a third sensor S-3 is located downstream of the blade D-1 on the alternate path when dual alternate outputs are desired. The sensors, blades and controller all function to control the flow of bottles in the directions as intended. Note FIG. 3 for a schematic illustration of the programmable controller PC receiving inputs from the sensors S-1, S-2, S-3, etc. and for switching the blades 50 for energizing solenoids Sol-1, Sol-2, etc. in the intended manner.

By way of example, if one of the blow molding machines were to be rendered inoperative for one reason or another, either at the blow molding machine itself or along the path of travel in advance of its first blade, the other molding machines could then direct their flows alternately to both the first, second and third base cupping machines. The base cupping machines could then be operated at a reduced rate of speed commensurate with the output of the operative blow molding machines. When the inoperative machine was fixed or the movement of container bodies along its associated path resumed, all base cupping machines could return to their normal speeds. All of the switches are coupled electronically with a programmable controller to effect the intended movements under the varying operating parameters consistent with the most efficient use of the machinery operating within the system.

Located immediately downstream of each blow molding machine is an independent input feed mechanism F-1, F-2 and F-3 for container bodies. In this manner, container bodies may be fed to maintain their flow independent of the operation of the molding machines. Drop gates G-1, G-2 and G-3 are preferably provided to pivot away a portion of a supporting channel 38 or 40 along a conveyor path in the event of a jam. Typical input feed mechanisms and drop gates are described in the aforementioned application. They are also commercially available from Aidlin Automation Corp. of Bradenton, Fla. Such additional features further minimize complications caused by malfunctions.

In the second embodiment, a single molding machine M-4 is utilized in association with three (3) bottle assembly machines B-4, B-5 and B-6. Note FIG. 4. The relative speed between the blow molding machine and the base cupping machines is normally such that the output of the molding machine is three (3) times the capacity of any of the base cupping machines. In this manner, the output flow of container bodies 12 from the blow molding machine M-4 will be directed by a diverter blade D-7 on the primary path P-4 of travel along the input conveyor mechanisms to a first alternate conveyor A-7 and a first base cupping machine B-4 until the track thereto is full and detected by the sensor S-4 immediately downstream from the diverter gate D-7. When such condition arises, a stockpile for feeding has been created to the first base cupping machine allowing the feed to be directed elsewhere temporarily. The controller PC will then energize the diverter blade D-7 and divert the flow of container bodies to the second base cupping machine B-5 along the second alternate conveyor A-8. Such feed will continue until the track to the second bottle assembly machine is full as detected by the second sensor S-5 immediately downstream of the diverter gate D-8 on the second alternate conveyor. At such time the gate D-8 is switched to allow feeding along the alternate path A-9 to the third base cupping machine B-6 until the sensor S-6 detects that the third alternate path A-9 is full. At such time, the flow of container bodies is diverted through the switching of the diverter gates D-7 and D-8 back to the initial condition of filling the track to the first base cupping machine.

Note is taken that the blade D-7 has a sensor S-7 upstream and a plurality of sensors S-5 and S-6 downstream along the primary path. The second downstream sensor S-4 is for the alternate path. In all instances each blade has a sensor on one side of the blade as well as at least two (2) sensors on the other side of the blade. The primary path P-4 from the blow molding machine M-4 takes a circuitous route to effectively constitute a storage space for the bottles prior to reaching the base cupping machine, insurance for a blow molding machine malfunction.

In yet another embodiment of the invention, a single blow molding machine M-5 is used to feed two (2) base cupping machines B-7 and B-8. Note FIG. 5. A first diverter blade D-9 directs the flow of container bodies 12 to the first base cupping machine B-7. In the event of a misfeed to one of the base cupping machines, a first blade D-10 is activated to divert the flow of container bodies 12 to a shunt or surge area 66 without turning off the blow molding machine M-5. This area is simply an alternate conveyor 46 and constitutes a temporary holding location for container bodies 12 coming off the blow molding machine M-5 until the misfeed situation is corrected. Thereafter, the surge area can be modified by switching converging blade C-8 to direct the container bodies 12 from the surge area 66 to either or both of the base cupping machines, B-7 and B-8. Such surge areas 66 may be placed on the primary embodiment, or any other embodiment, as desired. Sensors S-8, S-9 and S-10 detect the need for employment of the surge area.

Figure 6:
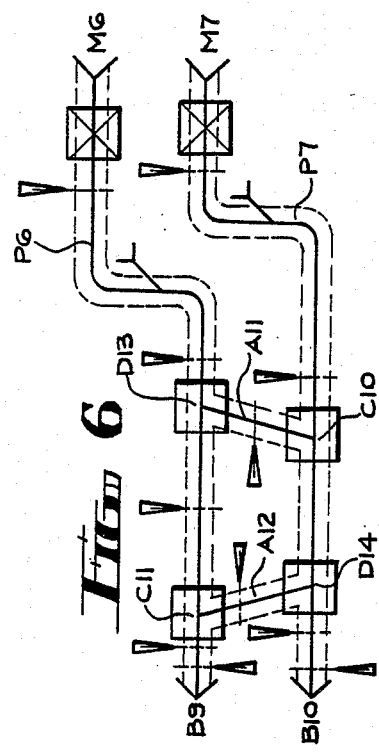

The final embodiment is shown in FIG. 6. It is similar to the primary embodiment except that only two (2) blow molding machines M-6 and M-7 feed two (2) base cupping machines B-9 and B-10 along two (2) primary paths P-6 and P-7 with only two (2) cross-over conveyors A-11 and A-12. A diverter blade D-13 and D-14 and a converger blade C-10 and C-11 are on each primary path P-6 and P-7 along with appropriate sensors for maximum efficiency.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described, what is claimed is:

1. A system for directing a flow of container bodies to a plurality of base cupping machines from a plurality of blow molding machines comprising:
   a plurality of primary conveyors, each primary conveyor adapted to feed container bodies from a blow molding machine toward a base cupping machine;
   a plurality of cross-over conveyors for feeding container bodies from one of the primary conveyors to another of the primary conveyor;
   diverter and converger blades positioned at the junction of primary and cross-over conveyors to direct container bodies between various primary conveyors;
   a sensor upstream and two sensors downstream of each diverter blade and a sensor downstream and two sensors upstream of each converger blade to detect the flow of container bodies therepast; and
   programmable control means responsive to the sensors to switch the blades as required for proper feeding of container bodies.

2. The system as set forth in claim 1 and further including a surge path coupled to at least one conveyor through a diverter gate and a converger gate to accept a temporary quantity of containers during a malfunction of a part of the system.

3. The system as set forth in claim 1 wherein a plurality of cross-over conveyors couple each primary conveyor to each other primary conveyor.

4. A conveyor assembly for transporting container bodies from one or more first locations to one or more second locations, the conveyor assembly including:
   primary pneumatic conveyor means for conveying container bodies from a first location to a second location;
   a plurality of diverter gates along the primary conveyor means to divert the conveyed container bodies from a primary conveyor path to one of a plurality of alternate conveyor paths;
   a plurality of converger gates along the primary conveyor means to direct the conveyed container bodies from one of a plurality of alternate conveyor paths to a primary conveyor path;
   a plurality of sensors associated with each converger gate upstream thereof and a plurality of sensors associated with each diverter gate downstream thereof for effecting the switching of each gate.

5. The conveyor assembly as set forth in claim 4 wherein each diverter gate is pivotable about a vertical axis downstream of the juncture of the primary conveyor and alternate path.

6. The conveyor assembly as set forth in claim 4 wherein each converger gate is pivotable about a vertical axis upstream of the juncture of the primary conveyor and alternate path.

7. A method of feeding a flow of container bodies to one or a plurality of base cupping machines from one or a plurality of blow molding machines comprising:
   providing primary conveyor means for feeding container bodies from a blow molding machine toward a base cupping machine;
   providing a secondary conveyor means for feeding container bodies from the primary conveyor means to a preselected base cupping machine;
   positioning diverter and converter blades at the function of the primary and secondary conveyor means to direct container bodies along a preselected path to a preselected base cupping machine, the diverter blades being adapted to forward conveyed container bodies from a primary conveyor path to one of a plurality of alternate conveyor paths and the converger blade adapted to direct the conveyed container bodies from one of a plurality of alternate conveyor paths to a primary conveyor path;
   sensing the movement of container bodies upstream of each blade and downstream of each blade along the primary conveyor and secondary conveyor; and
   controlling the blades through programmable control means in response to signals from the sensing adjacent to the blades.

* * * * *